United States Patent [19]

Sugiyama

[11] Patent Number: 5,691,749
[45] Date of Patent: Nov. 25, 1997

[54] IMAGE DISPLAY APPARATUS

[75] Inventor: Kazuyuki Sugiyama, Nagaokakyo, Japan

[73] Assignee: Mitsubishi Denki Kabushiki Kaisha, Tokyo, Japan

[21] Appl. No.: 299,604

[22] Filed: Sep. 1, 1994

[30] Foreign Application Priority Data

Dec. 21, 1993 [JP] Japan ................. 5-322586

[51] Int. Cl.$^6$ ........................................ G06F 3/14
[52] U.S. Cl. .................................................... 345/181
[58] Field of Search ............................ 345/76, 180, 181, 345/207, 13, 14

[56] References Cited

U.S. PATENT DOCUMENTS 4,190,831  2/1980  Stahle et al. .................. 345/181
4,975,691  12/1990  Lee .................................. 340/781
5,134,389  7/1992  Furuta et al. ................... 345/180

*Primary Examiner*—Mark R. Powell

[57] ABSTRACT

An image display apparatus detects the position of a point on a screen opposed to a photosensor based on the average of the number of scanning lines displayed before detecting an electron beam in the first scanning direction by the photosensor, and based on the number of scanning lines displayed before detecting an electron beam in the second scanning direction by the photosensor. The point may further or alternately be detected using the average of a time required from the start of one horizontal line scanning operation to detection of the electron beam, by the photosensor, in the first scanning direction, and a time required from the start of another one horizontal line scanning operation to detection of the electron beam, by the photosensor, in the second scanning direction.

19 Claims, 7 Drawing Sheets

IMAGE DISPLAY APPARATUS

BACKGROUND OF THE INVENTION

1. Field of the Invention

The present invention relates to an image display apparatus in which a photosensor is opposed to a screen scanned with an electron beam, and the position of a point on the screen opposed to the photosensor can be correctly detected.

2. Description of Related Art

A variety of entertainment games using a screen of an image display apparatus such as a television set have recently been developed. In playing some of these entertainment games, a player aims a photosensor at a moving object displayed on the screen and pushes or triggers a switch of a game machine when he believes that the photosensor is exactly opposed to the moving object. When the moving object is actually opposed to the photosensor, the displayed moving object is erased or a broken and scattered image is displayed instead of the original moving object.

FIG. 1 is a block diagram showing the structure of a television set in which the position of a point on a screen is to be detected by a photosensor and is used for such a game. A video signal SV inputted through a video signal input terminal 1 is inputted to a signal processing circuit 2 and a synchronous separation circuit 3. An output signal from the signal processing circuit 2 is inputted to a CRT driving circuit 6 via a switching circuit 5. An output signal from the CRT driving circuit 6 is supplied to a CRT 7.

A vertical synchronization signal VSYC outputted by the synchronous separation circuit 3 is inputted to a character generator 4, a vertical output circuit 12 and a reset terminal 15R of a vertical counter 15. An output signal from the vertical output circuit 12 is supplied to a vertical deflection coil 8 fixed to the CRT 7. A horizontal synchronization signal HSYC outputted by the synchronous separation circuit 3 is inputted to the character generator 4, a horizontal driving circuit 10, a reset terminal 14R of a horizontal counter 14 and a clock terminal 15C of the vertical counter 15.

An output signal from the horizontal driving circuit 10 is inputted to a horizontal output circuit 11. An output signal from the horizontal output circuit 11 is supplied to a horizontal deflection coil 9 fixed to the CRT 7. A raster detection signal SA outputted by a photosensor 16 which is to be opposed to the screen of the CRT 7 is inputted to a gate circuit 18. A switching signal SS generated by a manually operated trigger switch 17 is inputted to a control terminal 18CNT of the gate circuit 18 and a processor 27.

A signal outputted by the gate circuit 18 is inputted to a hold terminal 14H of the horizontal counter 14, a hold terminal 15H of the vertical counter 15 and the processor 27. A clock signal outputted by an oscillation circuit 13 is inputted to a clock terminal 14C of the horizontal counter 14. The count value HCT of the horizontal counter 14 and the count value VCT of the vertical counter 15 are supplied to the processor 27. A character generator control signal SCC outputted by the processor 27 is inputted to the character generator 4. A raster signal SR outputted by the character generator 4 is inputted to the CRT driving circuit 6 via the switching circuit 5. A character position data CD outputted by the character generator 4 is inputted to the processor 27.

The operation of such a television set will be described below. FIG. 2 shows the relationship between a point on the screen indicated by the photosensor and the scanning lines.

When the photosensor 16 is opposed to a point on the screen C as shown in FIG. 2 and the trigger switch 17 is turned on, a switching signal SS generated by the trigger switch 17 is inputted to the processor 27 and the control terminal 18CNT of the gate circuit 18. Then, the processor 27 starts detecting the position of the point on the screen C opposed to the photosensor 16.

First, the processor 27 inputs a character generator control signal SCC to the character generator 4 so as to allow the character generator 4 to output the raster signal SR for one field of a white raster. Then, the character generator 4 outputs a raster signal SR for displaying one field of a white raster to the switching circuit 5. When a horizontal synchronization signal HSYC is outputted by the synchronous separation circuit 3, the horizontal output circuit 11 supplies an output signal to the horizontal deflection coil 9 in response to an output signal from the horizontal driving circuit 10. When a vertical synchronization signal VSYC is outputted by the synchronous separation circuit 3, the vertical output circuit 12 supplies an output signal to the vertical deflection coil 8.

During the output of the raster signal SR, an alternative terminal of the switching circuit 5 connects to the character generator 4 so as to supply the raster signal SR to the CRT 7 via the CRT driving circuit 6. As a result, scanning is performed with an electron beam from the upper portion of the screen, thereby displaying one field of a white raster on the screen of the CRT 7. In the duration from the input of the switching signal SS to the control terminal 18CNT of the gate circuit 18 to the extinguish of the raster signal SR, the gate circuit 18 is on. Therefore, a raster detection signal SA outputted by the photosensor 16 can be inputted to the horizontal counter 14, the vertical counter 15 and the processor 27.

Until the electron beam on the screen opposed to the photosensor 16 is detected by the photosensor 16, the horizontal counter 14 counts clock signals inputted by the oscillation circuit 13. The count value of the horizontal counter 14 is reset every time a horizontal synchronization signal HSYC is inputted to the reset terminal 14R of the horizontal counter 14. The horizontal synchronization signal HSYC is inputted to the clock terminal 15C of the vertical counter 15. The vertical counter 15 counts horizontal synchronization signals HSYC, that is, the number of the scanning lines, until the electron beam at the point on the screen C opposed to the photosensor 16 is detected.

When the electron beam at the point on the screen C opposed to the photosensor 16 is detected, the photosensor 16 outputs a raster detection signal SA. The raster detection signal SA is inputted to the hold terminals 14H of the horizontal counter 14 and the hold terminal 15H of the vertical counter 15 via the gate circuit 18. Thereby the count values HCT of the horizontal counter 14 and the count value VCT of the vertical counter 15 are held. By these held count values HCT and VCT, the number of the scanning lines between the uppermost scanning line L1 and the scanning line Ln when the raster detection signal SA is outputted, and a term tHF from the start of the scanning of the scanning line Ln to the output of the raster detection signal SA is obtained.

Then, the processor 27 reads out the count values HCT of the horizontal counter 14 and the count value VCT of the vertical counter 15, and calculates the vertical and the horizontal direction positions based on the read count values HCT and VCT, thereby the position of the point on the screen C opposed to the photosensor 16 is detected.

In the conventional television set having the aforementioned structure, the position of a point on the screen opposed to the photosensor 16 is detected based on the one-direction electron beam scanning conducted from the upper portion to the lower portion of the screen in order. Therefore, when the spot of the electron beam has a shape of, for example, a circle having a certain area as shown with a broken line in FIG. 2, the photosensor 16 detects the electron beam before the electron beam reaches the position on the screen C opposed to the photosensor 16. In other words, when the peripheral part of the circular spot coincides with the point on the screen C, the photosensor 16 detects a point on the screen A, which is the center of the circular spot, as if it were the point on the screen C. Therefore, the detection accuracy disadvantageously varies depending upon a variation of the spot shape of the electron beam and the focus characteristics and the fluctuation in the spot diameter of the electron beam owing to the difference in the size of the CRT.

SUMMARY OF THE INVENTION

The present invention has been developed to solve the above-mentioned problems. One of the objectives of the invention is to provide an image display apparatus in which an accuracy in the detection of a point on a screen opposed to a photosensor does not vary depending upon a variation of the spot shape and the focus characteristics of an electron beam as well as the fluctuation in the spot diameter of the electron beam due to the difference in the size of a CRT.

The image display apparatus of the invention comprises scanning direction switching means for switching the direction of the electron beam scanning between a first scanning direction, in which scanning is conducted from the upper portion to the lower portion of the screen in order, and a second scanning direction, in which scanning is conducted from the lower portion to the upper portion of the screen in order; and means for calculating the average of a value indicating the position of a first point on a screen detected by the scanning in the first scanning direction and a value indicating the position of a second point detected by the scanning in the second scanning direction. Therefore, when the first scanning direction is selected, scanning is performed with an electron beam from the upper portion to the lower portion of the screen to obtain the value indicating the position of the first point at which the photosensor detects the electron beam is obtained. When the second scanning direction is selected, scanning is performed with an electron beam from the lower portion to the upper portion of the screen, to obtain the value indicating the position of the first point at which the photosensor detects the electron beam is obtained. Then, the average of the values indicating the first point and the second point is calculated to obtain a value indicating the position of the point opposed to the photosensor.

In this manner, the detection accuracy does not vary depending upon a variation of the spot shape and the focus characteristics of the electron beam and the like.

The above and further objects and features of the invention will more fully be apparent from the following detailed description with accompanying drawings.

DESCRIPTION OF THE PREFERRED EMBODIMENTS

The present invention will now be described referring to the accompanying drawings.

Figure 1:
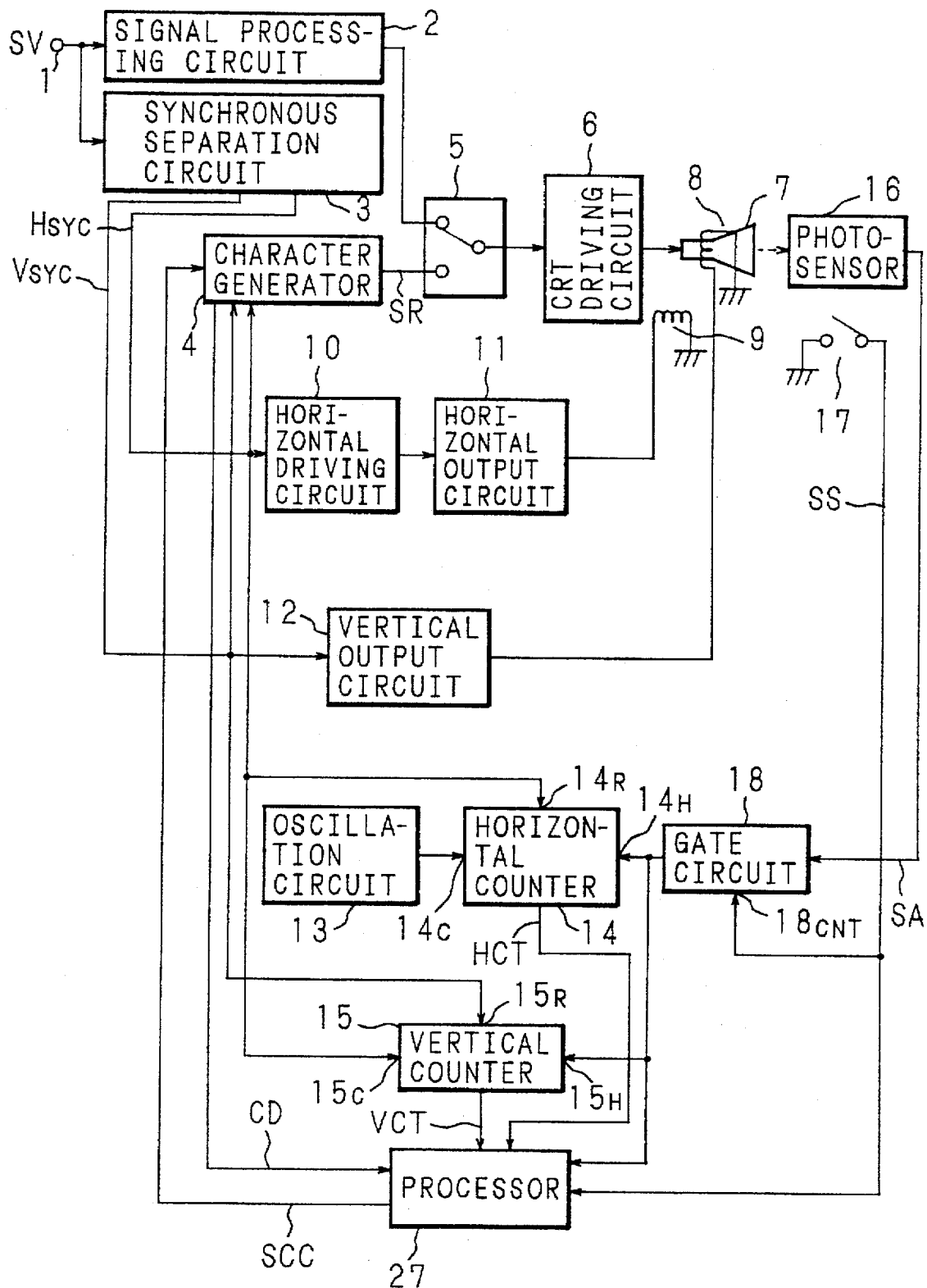
FIG. 1 is a block diagram of a conventional television set.
Figure 2:
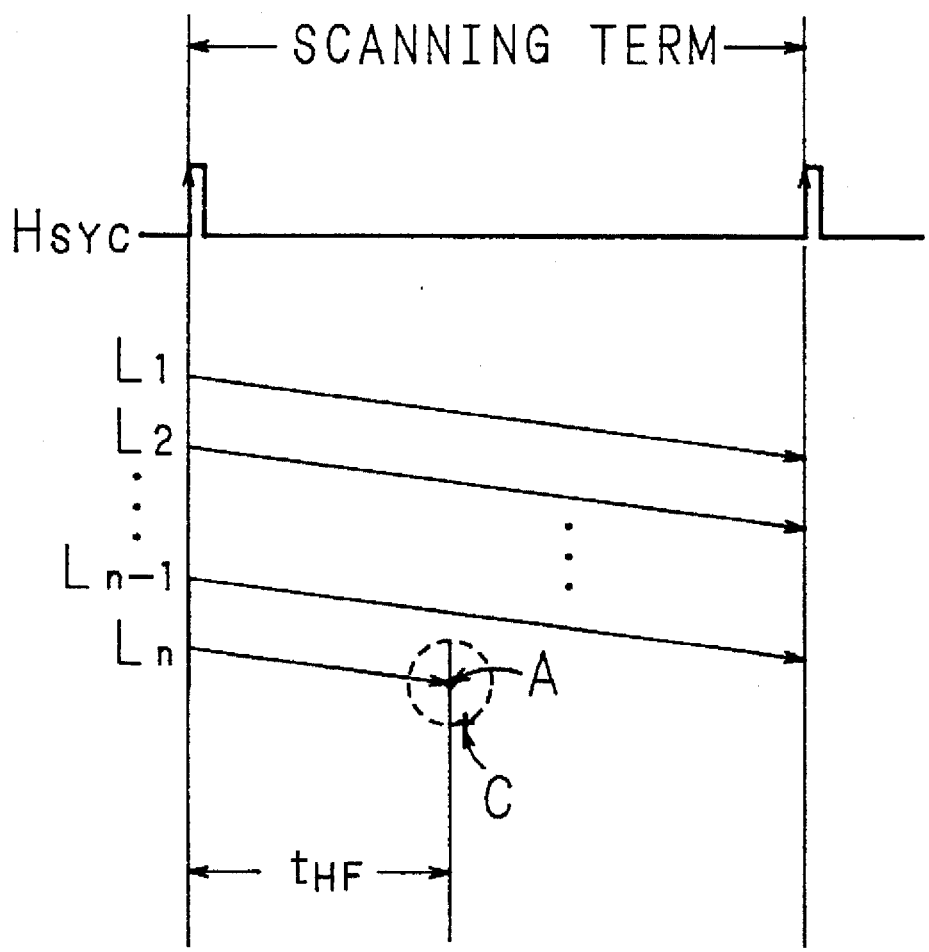
FIG. 2 shows the relationship between scanning lines and points on a screen to be detected in the conventional television set.
Figure 3:
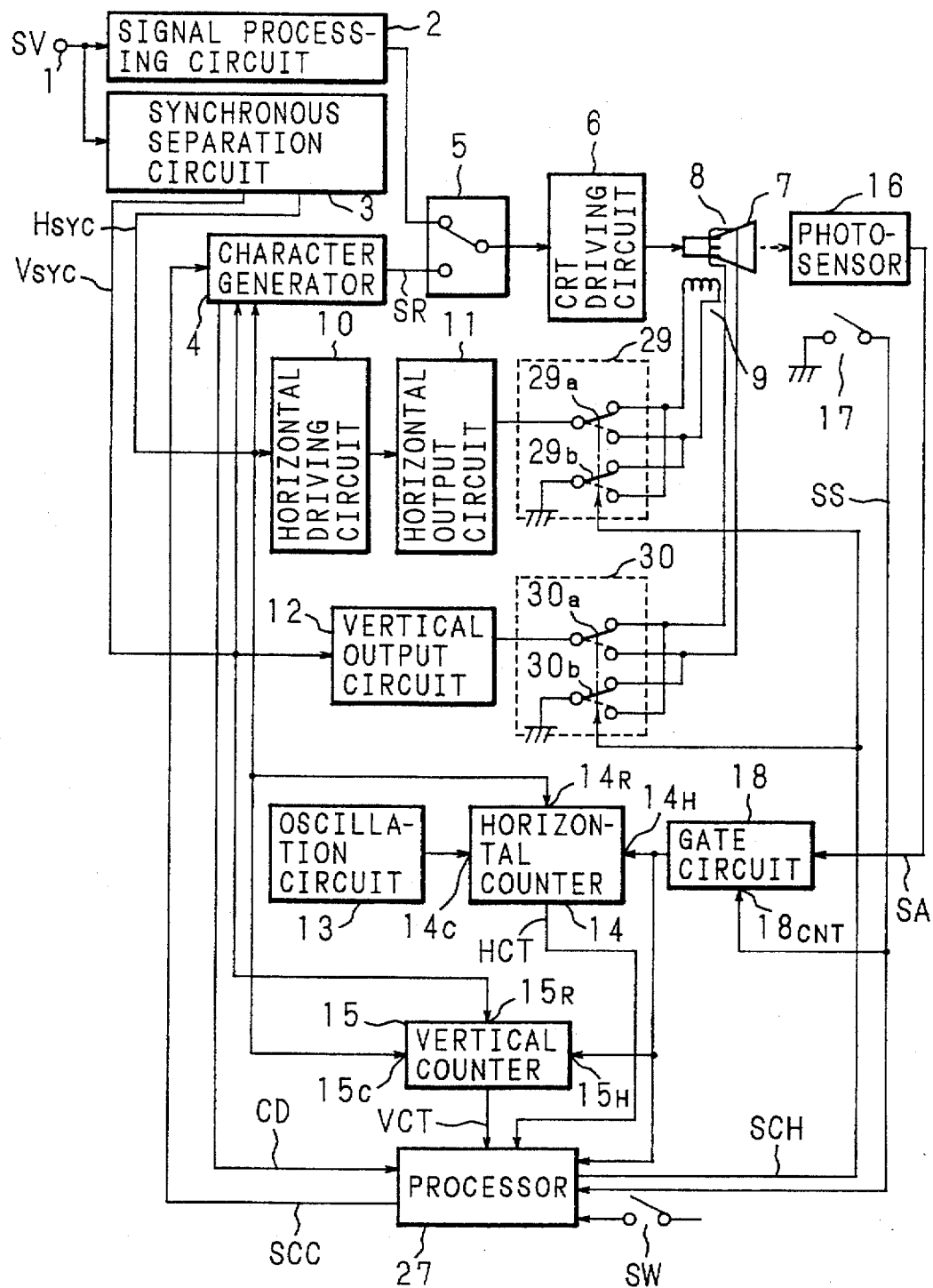
FIG. 3 is a block diagram of an image display apparatus according to the present invention.

FIG. 3 is a block diagram showing the structure of an image display apparatus according to the present invention. A video signal SV inputted through a video signal input terminal 1 is inputted to a signal processing circuit 2 and a synchronous separation circuit 3. An output signal from the signal processing circuit 2 is inputted to a CRT driving circuit 6 via a switching circuit 5. An output signal from the CRT driving circuit 6 is supplied to a CRT 7.

A vertical synchronization signal VSYC outputted by the synchronous separation circuit 3 is inputted to a character generator 4, a vertical output circuit 12 and a reset terminal 15R of a vertical counter 15. An output signal from the vertical output circuit 12 is supplied to a vertical deflection coil 8 fixed to the CRT 7 via a switching contact 30a of a change-over switch 30. The vertical deflection coil 8 is grounded via a switching contact 30b. The change-over switch 30 is constituted such that the switching contact 30b is connected by switching to one terminal (the other terminal) of the vertical deflection coil 8, when the switching contact 30a is connected by switching to the other terminal (one terminal) of the vertical deflection coil 8.

A horizontal synchronization signal HSYC outputted by the synchronous separation circuit 3 is inputted to the character generator 4, a horizontal driving circuit 10, a reset terminal 14R of a horizontal counter 14 and a clock terminal 15C of the vertical counter 15. An output signal from the horizontal driving circuit 10 is inputted to a horizontal output circuit 11. An output signal from the horizontal output circuit 11 is supplied to a horizontal deflection coil 9 fixed to the CRT 7 via a switching contact 29a of a change-over switch 29. The horizontal deflection coil 9 is grounded via a switching contact 29b. The change-over switch 29 is constituted such that the switching contact 29b is connected by switching to one terminal (the other terminal) of the vertical deflection coil 9, when the switching contact 29a is connected by switching to the other terminal (one terminal) of the vertical deflection coil 9. Semiconductor switches are practically used as the change-over switches 29 and 30 to perform the above-mentioned switching operation.

A raster detection signal SA outputted by a photosensor 16 opposed to the screen of the CRT 7 is inputted to a gate circuit 18. A switching signal SS generated by a trigger switch 17 is inputted to a control terminal 18CNT of the gate circuit 18 and a processor 27. A signal outputted by the gate circuit 18 is inputted to a hold terminal 14H of the horizontal counter 14, a hold terminal 15H of the vertical counter 15 and the processor 27.

A clock signal outputted by an oscillation circuit 13 is inputted to a clock terminal 14C of the horizontal counter 14. A count value HCT of the horizontal counter 14 and a count value VCT of the vertical counter 15 are inputted to the processor 27. A character generator control signal SCC outputted by the processor 27 is inputted to the character generator 4. A raster signal SR outputted by the character generator 4 is inputted to the CRT driving circuit 6 via the switching circuit 5. A character position data CD outputted by the character generator 4 is inputted to the processor 27.

A scanning direction switching signal SCH outputted by the processor 27 is supplied to the change-over switches 29 and 30. The processor 27 is connected to, for example, a power source for signals (not shown) via a switch SW. A field term when the character generator 4 outputs a raster signal SR can be appropriately determined by turning on/off the switch SW, for example, depending upon the frequency of turning on/off the switch SW.

Figure 4:
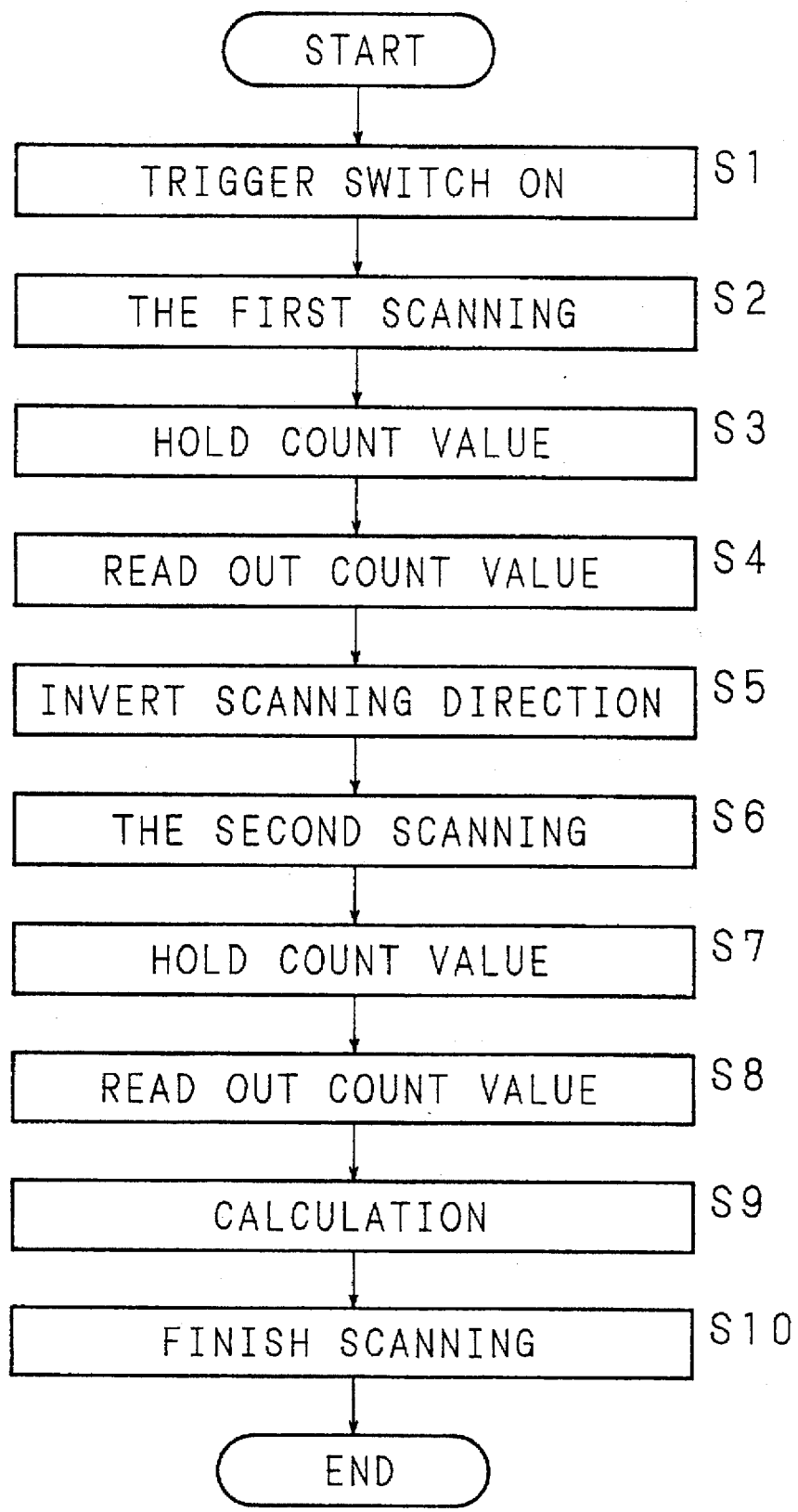
FIG. 4 is a flow chart showing a control operation of a processor shown in FIG. 3.
Figure 5:
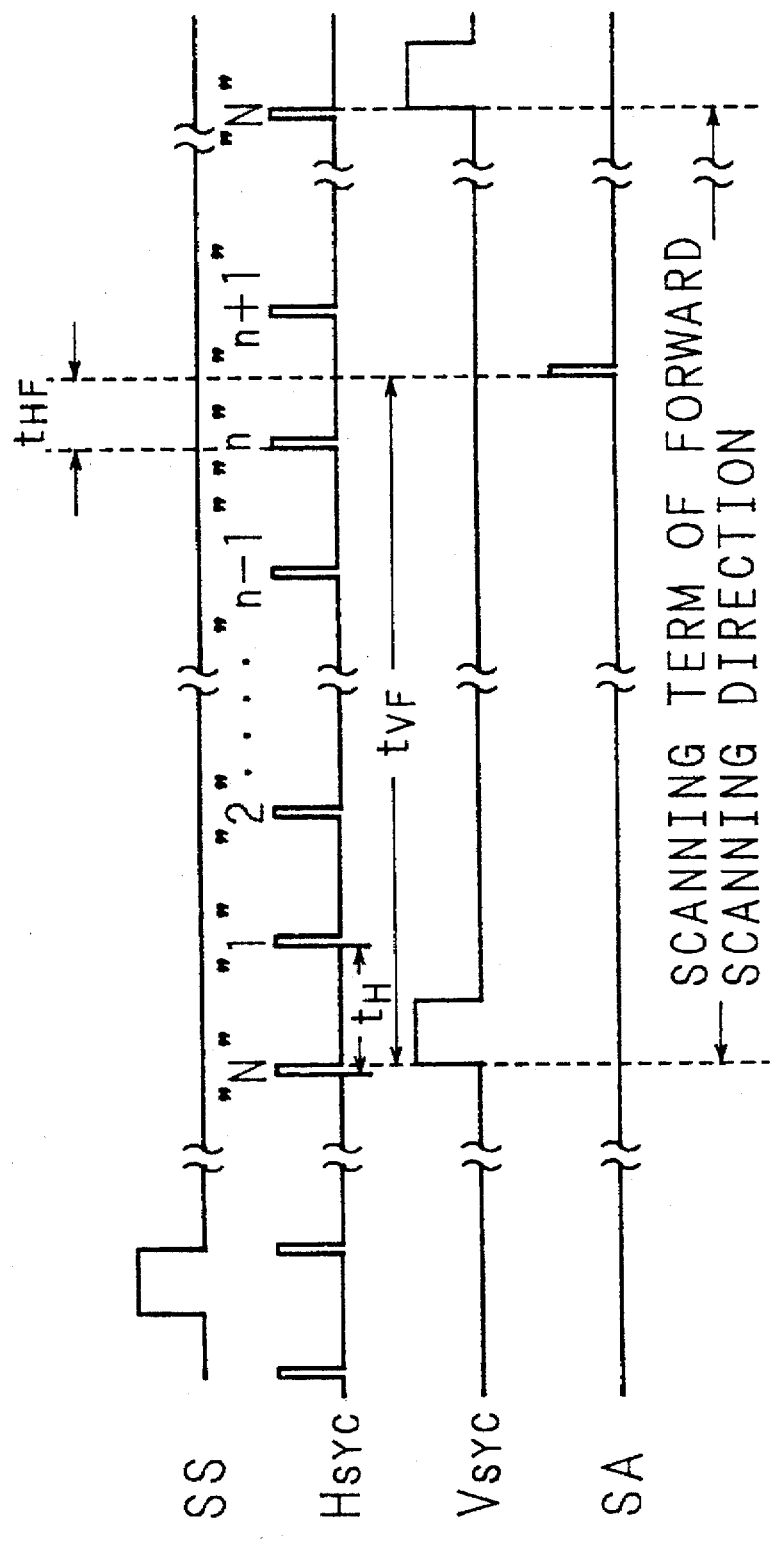
FIG. 5 is a timing chart of signals in the embodiment of the invention.
Figure 6:
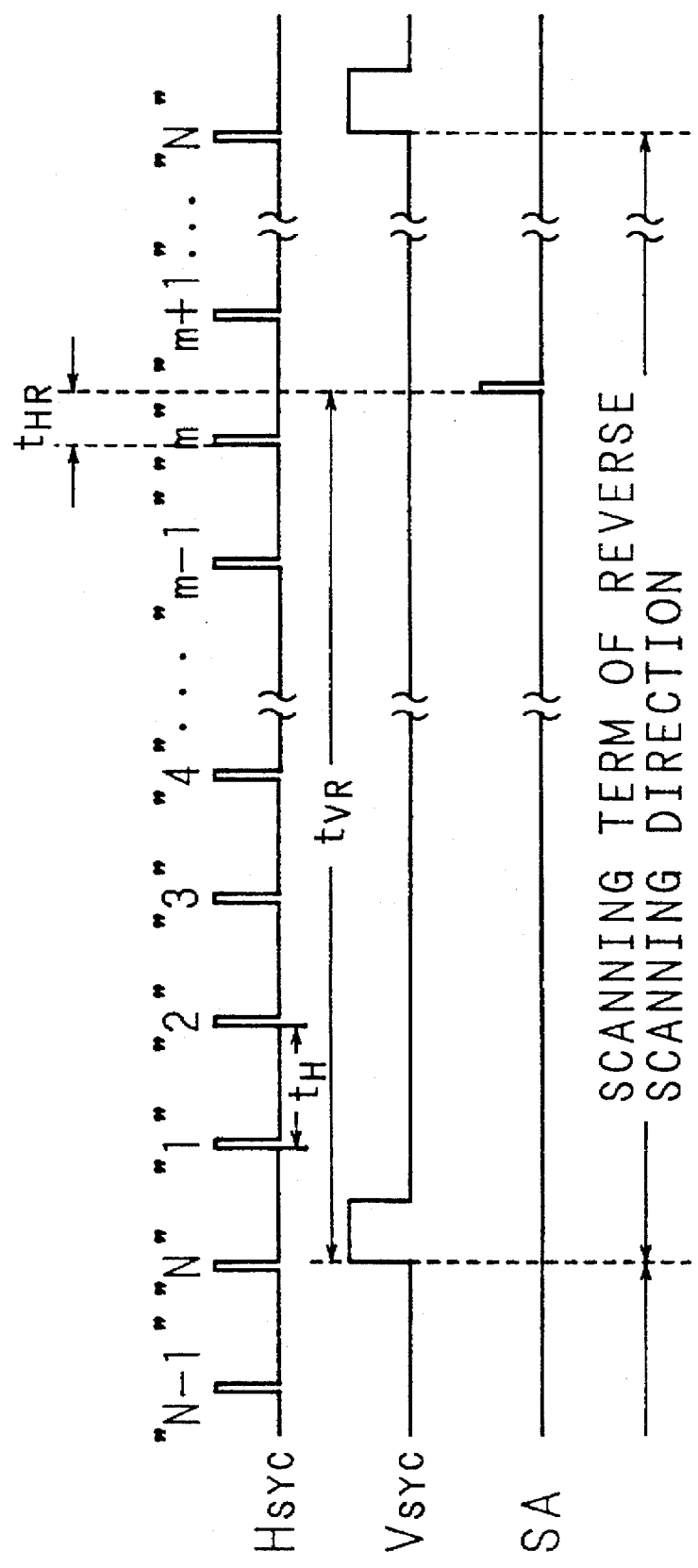
FIG. 6 is a timing chart of signals in the embodiment of the invention.
Figure 7:
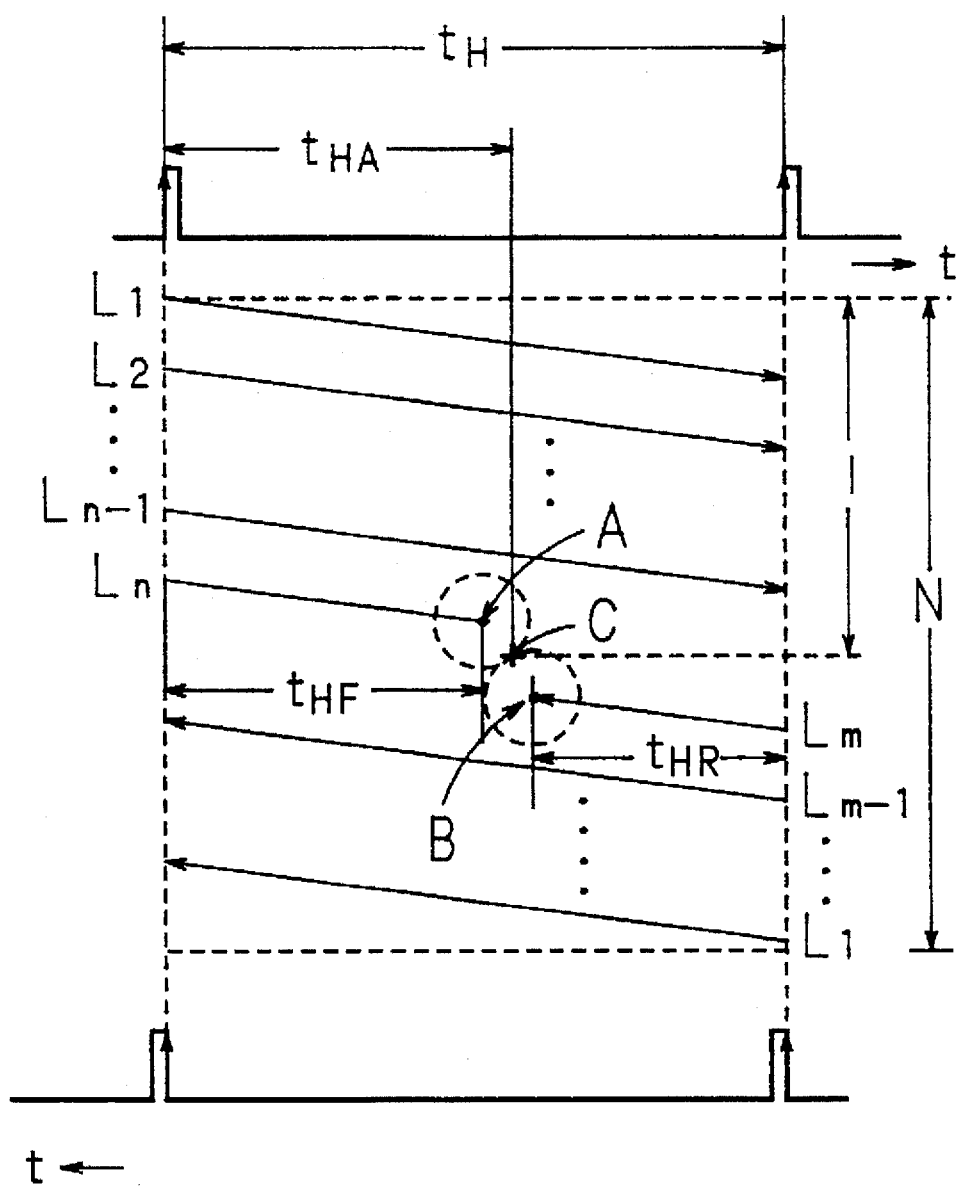
FIG. 7 shows the relationship between scanning lines and a point on a screen to be detected in the image display apparatus of the invention.

The operation of the image display apparatus having the above-mentioned structure will now be described. FIG. 4 is a flow chart showing a control operation of the processor 27. FIGS. 5 and 6 are timing charts of each signal. FIG. 7 shows the relationship between the position of a point on the screen to be detected and scanning lines.

First, the image display apparatus is actuated. A case where the position of a point on the screen C as shown in FIG. 7 is to be detected is herein described as an example. An operator aims the photosensor 16 at the point on the screen C of the CRT 7 and turns on the trigger switch 17 (step S1). By turning on the trigger switch 17, a switching signal SS is inputted to the processor 27. The processor 27 starts controlling the first scanning operation (hereinafter referred to as the "forward scanning") for detecting the position of the point on the screen C opposed to the photosensor 16 (step S2). The processor 27 supplies the character generator 4 with a character generator control signal SCC for allowing the character generator 4 to output a white raster of, for example, one field.

In receiving the character generator control signal SCC, the character generator 4 outputs to the switching circuit 5 a raster signal SR for imaging one field of a white raster. During the output of the raster signal SR, the switching circuit 5 connects by switching to the character generator 4. Thereby, the raster signal SR is supplied to the CRT 7 via the CRT driving circuit 6. During the output of the raster signal SR from the time of supplying of the switching signal SS to the control terminal 18CNT of the gate circuit 18, the gate circuit 18 is on. A horizontal synchronization signal HSYC outputted by the synchronous separation circuit 3 is inputted to the horizontal output circuit 11 via the horizontal driving circuit 10. A vertical synchronization signal VSYC is inputted to the vertical output circuit 12.

An output signal relating to the horizontal synchronization signal HSYC from the horizontal output circuit 11 is supplied to the horizontal deflection coil 9 via the change-over switch 29. When the vertical synchronization signal VSYC is outputted by the synchronous separation circuit 3, an output signal from the vertical output circuit 12 is supplied to the vertical deflection coil 8 via the change-over switch 30. As a result, an electron beam is scanned on the screen of the CRT 7 from the upper portion to the lower portion of the screen in order, thereby displaying a white raster.

The horizontal counter 14 starts counting clock signals outputted by the oscillation circuit 13 at the time of the input of a horizontal synchronization signal HSYC. Every time the horizontal counter 14 receives a horizontal synchronization signal HSYC, the count value is reset. The vertical counter 15 starts counting horizontal synchronization signals HSYC at the time of the input of a vertical synchronization signal VSYC. When a white raster is displayed up to the vicinity of the point on the screen C opposed to the photosensor 16, the photosensor 16 detects the electron beam, so that the photosensor 16 outputs a raster detection signal SA. The raster detection signal SA is sent to the gate circuit 18 to reach the hold terminals 14H of the horizontal counter 14 and the hold terminal 15H of the vertical counter 15, the count values HCT of the horizontal counter 14 and the count value VCT of the vertical counter 15 are held (step S3).

Thus, as shown in FIG. 5, the obtained count value VCT of the vertical counter 15 corresponds to a term tVF from the rise of the vertical synchronization signal VSYC to the rise of the raster detection signal SA, and the obtained count value HCT of the horizontal counter 14 corresponds to a term tHF in one scanning operation from the start of scanning of a scanning line Ln corresponding to the nth horizontal synchronization signal HSYC to the rise of the raster detection signal SA. From these held count values HCT and VCT, the position of a first point on the screen A on the scanning line Ln as shown in FIG. 7 is determined. Then, the processor 27 reads out the count values of the horizontal counter 14 and the count value VCT of the vertical counter 15 (step S4).

The processor 27 then outputs a scanning direction switching signal SCH to invert the scanning direction (step S5). Thus, the processor 27 starts controlling the second scanning operation (hereinafter referred to as the "reverse scanning") (step S6). When the scanning direction switching signal SCH is supplied to the change-over switches 29 and 30, the switching contacts 29a and 30a change the connections as shown with broken lines in FIG. 7, resulting in inverting the directions of supplying an output signal from the horizontal output circuit 11 to the horizontal deflection coil 9 and the direction of supplying an output signal from the vertical output circuit 12 to the vertical deflection coil 8.

The processor 27 also outputs a character generator control signal SCC to the character generator 4, thereby allowing the character generator 4 to output one field of a raster signal SR as mentioned in the description of the forward scanning. Then, scanning is performed on the screen with an electron beam successively from the lower portion to the upper portion of the screen in order, thereby displaying a white raster. The gate circuit 18 is on during the output of the raster signal SR. The positions of the scanning lines in the white raster are the same as those in the forward scanning. Also as described above, the horizontal counter 14 starts counting clock signals outputted by the oscillation circuit 13 at the time of the input of a horizontal synchronization signal HSYC, and resets the count value HCT every time a horizontal synchronization signal HSYC is inputted.

Also, the vertical counter 15 starts counting horizontal synchronization signals HSYC at the time of the input of a vertical synchronization signal VSYC. When, a raster is displayed up to the vicinity of the point on the screen C opposed to the photosensor 16, the photosensor 16 detects the electron beam, so that the photosensor 16 outputs a raster detection signal SA. The raster detection signal SA is sent to the gate circuit 18 to reach the hold terminals 14H of the horizontal counter 14 and the hold terminal 15H of the vertical counter 15, the count values HCT of the horizontal counter 14 and the count value VCT of the vertical counter 15 are held (step 7). As shown in FIG. 6, the obtained count value VCT of the vertical counter 15 corresponds to a term tVR from the rise of the vertical synchronization signal VSYC to the rise of the Paster detection signal SA. The obtained count value HCT of the horizontal counter 14 corresponds to a term tHR in one scanning operation from the start of scanning of a scanning line Lm corresponding to the mth horizontal synchronization signal HSYC to the rise of the raster detection signal SA.

From the held count values HCT and VCT, the position of a second point on the screen B on the scanning line Lm as shown in FIG. 7 is determined. Then, the processor 27 reads out the count values HCT of the horizontal counters 14 and the count value VCT of the vertical counter 15 (step S8). The processor 27 then performs calculations by using the following equations (step S9). Thereby a term tHA is obtained, required from the start of one scanning operation to reach the point on the screen C and the number of scanning lines 1 between the first scanning line L1 and the point on the screen C:

$$t_{HA} = t_{HF} + \frac{t_H(t_{HF} + t_{HR})}{2}$$

$$1 = n + \frac{N - (n+m)}{2}$$

In the above equations, tH indicates a horizontal scanning term; tHF indicates a term from the rise of a horizontal synchronization signal to the rise of a raster detection signal in the forward scanning; tHR indicates a term from the rise of a horizontal synchronization signal to the rise of a raster detection signal in the reverse scanning; N indicates the total number of the scanning lines between the upper portion to the lower portion on the screen; n indicates the number of scanning lines scanned before the output of the raster detection signal in the forward scanning; and m indicates the number of scanning lines scanned before the output of the raster detection signal in the reverse scanning.

Then, the position of the point on the screen C is determined based on the calculated term tHA and the number of the scanning lines 1. Thus, the processor 27 thereby finishes controlling the one-field scanning (step 10). In this manner, the operation for detecting the position of the point on the screen C is finished.

As described above, the position of a point on the screen opposed to the photosensor is detected based on the average of the values indicating the position on the screen opposed to the photosensor when detecting the electron beam scanning in the forward direction (the first scanning direction), and the value indicating the position on the screen opposed to the photosensor when detecting the electron beam scanning in the reversed direction (the second scanning direction). When the electron beam has a spot in the shape of, for example, a circle as shown with a broken line in FIG. 7, the photosensor detects the electron beam before it reaches the point C in both the forward and the reverse scannings, so that the positions of the points on the screen A and B, which are equally spaced from the point C, are detected. Then, by calculating the average of the values indicating the positions of the points on the screen A and B as described above, the position of the point on the screen C opposed to the photosensor 16, which is located between the points A and B, can be correctly detected.

Therefore, in this invention, the accuracy in detecting the position of a point on the screen does not vary depending upon the variation of the shape of the spot and the focus characteristics of an electron beam, or, the fluctuation in the spot diameter of the electron beam due to the difference in the size of the CRT.

In the above-mentioned embodiment, the raster with one field term both in the forward and the reverse scannings is used. The accuracy in the detection, however, can be further improved when the rasters with a plurality of fields by adjusting the number of the fields by using the switch SW is used.

Also in the embodiment, scanning is performed with an electron beam successively from the upper left to the lower right of the screen in the forward scanning and from the lower right to the upper left of the screen in the reverse scanning. Of course, the same effect can be obtained even when an electron beam is scanned from the upper right to the lower left in the forward scanning and from the lower left to the upper right in the reverse scanning.

Further, in the embodiment, both of the average of the number of scanning lines in the forward scanning and that in the reverse scanning, and the average of the term required from the start of one scanning to the output of a raster detection signal in the forward scanning and that in the reverse scanning are used. However, it is possible to shorten the detection time by using either of the averages.

As this invention may be embodied in several forms without departing from the spirit of essential characteristics thereof the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image display apparatus comprising:

a screen for displaying scanning lines generated by scanning of an electron beam;

scanning direction switching means for switching a scanning direction of the electron beam between a first scanning direction for scanning from a first portion to a second portion of said screen and a second scanning direction for scanning from the second portion to the first portion of said screen;

determining means, including a remotely located photosensor opposed to the screen, for determining a first number of scanning lines displayed prior to the photosensor detecting the electron beam scanning in the first scanning direction, the scanning direction switching means switching the scanning direction to the second scanning direction and restarting the electron beam scanning upon the determining means determining the first number of scanning lines, and for determining a second number of scanning lines displayed prior to the photosensor detecting the electron beam scanning in the second scanning direction; and calculating means for calculating an average of the first and second number of scanning lines determined and for determining the position of a point on said screen opposed to said photosensor based on the average calculated.

2. An image display apparatus comprising:

a screen for displaying scanning lines generated by scannings of an electron beam;

scanning direction switching means for switching a scanning direction of the electron beam between a first scanning direction for scanning from a first portion to a second portion of said screen and a second scanning direction for scanning from the second portion to the first portion of said screen;

determining means, including a remotely located photosensor opposed to the screen, for determining a first time period from a start of scanning until the photosensor detects the electron beam scanning in the first scanning direction, the scanning direction switching means switching the scanning direction to the second direction and restarting the electron beam scanning upon the determining means determining the first time period, and for determining a second time period from the start of scanning until the photosensor detects the electron beam scanning in the second scanning direction; and calculating means for calculating an average of the first and second time periods determined and for determining the position of a point on said screen opposed to said photosensor based on the average calculated.

3. An image display apparatus comprising:

a screen for displaying scanning lines generated by scannings of an electron beam;

scanning direction switching means for switching a scanning direction of the electron beam between a first scanning direction for scanning from a first portion to a second portion of said screen and a second scanning direction for scanning from the second portion to the first portion of said screen;

determining means, including a remotely located photosensor opposed to the screen, for determining a first number of scanning lines displayed prior to the photosensor detecting the electron beam scanning in the first scanning direction and for determining a first time period from a start of scanning until the photosensor detects the electron beam scanning in the first scanning direction, the scanning direction switching means switching the scanning direction to the second scanning direction and restarting the electron beam scanning upon the determining means determining the first number of scanning lines and the first time period, and for determining a second number of scanning lines displayed prior to the photosensor detecting the electron beam scanning in the second scanning direction and for determining a second time period from the restart of scanning until the photosensor detects the electron beam scanning in the second scanning direction; and calculating means for calculating a first average of the first and second number of scanning lines determined for calculating a second average of the first and second time periods determined and for determining the position of a point on said screen opposed to said photosensor based on the first and second averages calculated.

4. The image display apparatus of claim 1, wherein scanning in each of the first and second scanning directions is done in one field.

5. The image display apparatus of claim 1, wherein scanning in each of the first and second scanning directions is done in a plurality of fields.

6. The image display apparatus of claim 1, wherein a number of scanning fields in each of the first and second scanning directions is determined by scanning direction switching of said scanning direction switching means.

7. The image display apparatus of claim 2, wherein scanning in each of the first and second scanning directions is done in one field.

8. The image display apparatus of claim 2, wherein scanning in each of the first and second scanning directions is done in a plurality of fields.

9. The image display apparatus of claim 2, wherein number of scanning fields in each of the first and second scanning directions is determined by scanning direction switching of said scanning direction switching means.

10. The image display apparatus of claim 3, wherein scanning in each of the first and second scanning directions is done in one field.

11. The image display apparatus of claim 3, wherein scanning in each of the first and second scanning directions is done in a plurality of fields.

12. The image display apparatus of claim 3, wherein A number of scanning fields in each of the first and second scanning directions is determined by scanning direction switching of said scanning direction switching means.

13. The image display apparatus of claim 1, wherein the electron beam scans from an upper portion to a lower portion of the screen in the first scanning direction and scans from a lower portion to an upper portion of the screen in the second scanning direction.

14. The image display apparatus of claim 2, wherein the electron beam scans from an upper portion to a lower portion of the screen in the first scanning direction and scans from a lower portion to an upper portion of the screen in the second scanning direction.

15. The image display apparatus of claim 3, wherein the electron beam scans from an upper portion to a lower portion of the screen in the first scanning direction and scans from a lower portion to an upper portion of the screen in the second scanning direction.

16. An image display method, comprising the steps of:

(a) scanning an electron beam in a first scanning direction from a first portion of a display screen to a second portion of a display screen;

(b) detecting, by a photosensor remotely located from and opposed to the display screen, the electron beam scanning in the first scanning direction;

(c) determining a first number of scanning lines displayed on the display screen prior to the detecting in step (b);

(d) switching a scanning direction of the electron beam to a second scanning direction, from the second portion of the display screen to the first portion;

(e) restarting scanning of the electron beam in the second scanning direction;

(f) detecting, by the photosensor, the electron beam scanning in the second scanning direction;

(g) determining a second number of scanning lines displayed on the display screen prior to the detecting in step (f);

(h) calculating an average of the determined first and second number of scanning lines; and (i) determining the position of a point on the display screen, opposed to the photosensor, based on the average calculated.

17. The image display apparatus of claim 16, further comprising the steps of:

(j) determining a first time period, prior to step (d), from a start of scanning until the photosensor detects the electron beam scanning in step (b), wherein the switching of the scanning direction of step (d) occurs after step (j);

(k) determining a second time period, prior to step (h), from the restart of scanning in step (e) until the photosensor detects the electron beam scanning in step (f); and (l) calculating an average of the determined first and second time periods wherein the position of a point on the display screen is determined in step (h), based on both of the averages calculated in steps (h) and (l).

18. The image display apparatus of claim 16, wherein the electron beam scans from an upper portion to a lower portion of the screen in the first scanning direction and scans from a lower portion to an upper portion of the screen in the second scanning direction.

19. The image display apparatus of claim 17, wherein the electron beam scans from an upper portion to a lower portion of the screen in the first scanning direction and scans from a lower portion to an upper portion of the screen in the second scanning direction.

* * * * *